United States Patent
Chaudhary

(10) Patent No.: US 11,299,613 B2
(45) Date of Patent: Apr. 12, 2022

(54) ETHYLENE-ALPHA-OLEFIN COPOLYMER-TRIALLYL PHOSPHATE COMPOSITION

(71) Applicant: Dow Global Technologies LLC, Midland, MI (US)

(72) Inventor: Bharat I. Chaudhary, Princeton, NJ (US)

(73) Assignee: DOW GLOBAL TECHNOLOGIES LLC, Midland, MI (US)

(*) Notice: Subject to any disclaimer, the term of this patent is extended or adjusted under 35 U.S.C. 154(b) by 296 days.

(21) Appl. No.: 16/488,777

(22) PCT Filed: Feb. 21, 2018

(86) PCT No.: PCT/US2018/018911
§ 371 (c)(1),
(2) Date: Aug. 26, 2019

(87) PCT Pub. No.: WO2018/160403
PCT Pub. Date: Sep. 7, 2018

(65) Prior Publication Data
US 2020/0062943 A1 Feb. 27, 2020

Related U.S. Application Data

(60) Provisional application No. 62/464,411, filed on Feb. 28, 2017.

(51) Int. Cl.
| | |
|---|---|
| *C08L 23/16* | (2006.01) |
| *C09D 7/63* | (2018.01) |
| *C08F 210/16* | (2006.01) |
| *C08F 210/18* | (2006.01) |
| *C08K 5/01* | (2006.01) |
| *C08K 5/3435* | (2006.01) |
| *C08K 5/375* | (2006.01) |
| *C09D 123/16* | (2006.01) |
| *H01B 3/44* | (2006.01) |

(52) U.S. Cl.
CPC ............ *C08L 23/16* (2013.01); *C08F 210/16* (2013.01); *C08F 210/18* (2013.01); *C08K 5/01* (2013.01); *C08K 5/3435* (2013.01); *C08K 5/375* (2013.01); *C09D 7/63* (2018.01); *C09D 123/16* (2013.01); *H01B 3/441* (2013.01); C08F 2810/20 (2013.01); C08L 2201/08 (2013.01); C08L 2312/00 (2013.01)

(58) Field of Classification Search
CPC .. C08L 23/16; C08L 2312/00; C08L 2201/08; C08F 210/16; C08F 210/18; C08F 2810/20; C08K 5/375; C08K 5/01; C08K 5/3435; C09D 123/16; C09D 7/63; H01B 3/441

USPC ......................................................... 524/103
See application file for complete search history.

(56) References Cited

U.S. PATENT DOCUMENTS

| | | | |
|---|---|---|---|
| 3,974,132 A | 8/1976 | Valdiserri | |
| 4,198,310 A * | 4/1980 | Lyons .................. | H01B 7/2806 174/110 SR |
| 5,246,783 A | 9/1993 | Spenadel et al. | |
| 5,266,627 A | 11/1993 | Meverden et al. | |
| 6,277,925 B1 | 8/2001 | Biswas et al. | |
| 6,496,629 B2 | 12/2002 | Ma et al. | |
| 6,714,707 B2 | 3/2004 | Rossi et al. | |
| 7,858,705 B2 | 12/2010 | Parent et al. | |
| 2018/0305533 A1 | 10/2018 | Chaudhary et al. | |

FOREIGN PATENT DOCUMENTS

| | | | |
|---|---|---|---|
| EP | 1041581 | 10/2000 | |
| GB | 1011498 | 12/1965 | |
| WO | 2007053771 | 5/2007 | |
| WO | 2007056154 A2 | 5/2007 | |
| WO | 2010017553 | 2/2010 | |
| WO | 2010017554 | 2/2010 | |
| WO | WO-2010017554 A1 * | 2/2010 | ............ C08K 5/521 |
| WO | 2015009562 | 1/2015 | |
| WO | 2016200600 | 12/2016 | |

OTHER PUBLICATIONS

EPDM, Wikipedia, Aug. 13, 2021. (Year: 2021).*
Gaan, Sabyasachi, et al., "Effect of phosphorus and nitrogen on flame retardant cellulose: A study of phosphorus compounds," Journal of Analytical and Applies Pyrolysis, 2007, p. 371-377, v. 78, No. 2.
Gaan, Sabyasachi, et al., "Effect of phosphorus flame retardants on thermo-oxidative decomposition of cotton," Polymer Degradation and Stability, 2007, p. 968-974, v. 92, No. 6.
Mey-Marom, A., et al., "Thermal Decomposition Studies of Cotton Radiolytically Grafted with Phosphorus-and Bromine-Containing Flame Retardants," Journal of Applied Polymer Science, 1980, p. 691-702, v. 25, No. 4.

* cited by examiner

*Primary Examiner* — Hui H Chin

(57) ABSTRACT

A peroxide-curable ethylene copolymer composition comprising (A) a crosslinkable ethylene/alpha-olefin copolymer, (B) an effective amount of triallyl phosphate (TAP), (C) an organic peroxide; and, optionally, (D) a supplemental polymer; wherein the (A) crosslinkable ethylene/alpha-olefin copolymer is made by copolymerizing ethylene and an olefin-functional comonomer in the presence of a molecular catalyst useful therefor. Also provided are a cured product made from the composition, methods of making and using same, and articles containing same.

10 Claims, No Drawings

ETHYLENE-ALPHA-OLEFIN COPOLYMER-TRIALLYL PHOSPHATE COMPOSITION

The field includes ethylene/alpha-olefin copolymer compositions, cured products made therefrom, methods of making and using same, and articles containing same.

INTRODUCTION

Insulated electrical/optical conductors include insulated electrical conductors, insulated optical conductors, and insulated electro-optical conductors. Insulated optical conductors include coated optical fibers and optical fiber (fiber optic) cables for use in data-transmitting applications. Insulated electrical conductors include coated metal wires and electrical cables, including power cables for use in low, medium, high and extra-high voltage electricity-transmitting/distributing applications. Insulated electro-optical conductors include coated optical fibers and coated metal wires for using in data- and/or electricity-transmitting applications.

Various types of wire and cable compositions are mentioned in U.S. Pat. Nos. 3,974,132; 7,858,705 B2; WO 2007/056154; WO 2010/017553; WO 2010/017554; WO 2015/009562; WO 2016/200600 A1; PCT/US16/048014; or PCT/US16/056719.

U.S. Pat. No. 3,974,132 to L. L. Valdiserri ("VALDISERRI") relates to a process for curing olefin polymers. Mentioned are heat-curable ethylene polymer compositions wherein triallyl phosphate is used as a coagent. The composition also contains an organic peroxide "catalyst". Examples of the ethylene polymers mentioned include a low density polyethylene (LDPE); an ethylene copolymer having a $T_g$ (glass transition temperature) greater than 25 degrees Celsius (° C.); or an ethylene-propylene-1,4-hexadiene terpolymer. Based on discovery timeline, any catalyst used to make VALDISERRI's ethylene polymers would have been Ziegler-Natta catalyst.

U.S. Pat. No. 7,858,705 B2 to J. S. Parent et al. ("PARENT") relates to functionalized polyolefins, moisture curable polyolefin resins and processes of manufacturer (sic) thereof. In an aspect of Example 5, triallyl phosphate was included in an isotactic-polypropylene degradation formulation, prior to the addition of 3-mercaptopropyl trimethoxysilane. The isotactic-polypropylene was in a form of pellets and had a number average molecular weight of 50,000 and a polydispersity=3.8.

WO 2010/017554 A1 to B. Chaudhary et al. ("CHAUDHARY"; the same B. Chaudhary of the present filing) relates to polyolefin compositions with grafted flame-retardants. CHAUDHARY includes a flame-retardant composition made from or containing (a) a polyolefin and (b) a graftable, phosphorous-containing coagent. CHAUDHARY also includes a polyolefin having a grafted flame retardant bonded thereto. The (b) is in an amount greater than about 1.0 weight percent up to about 20.0 weight percent. Suitable graftable, phosphorous-containing coagent can simultaneously contain phosphorous, nitrogen, and silicon elements. Among others is an example that includes a metallocene-catalyzed ethylene-octene copolymer having an octene comonomeric content=7.3 mole percent. Ethylene/unsaturated ester copolymers are mentioned where the portion of the copolymer attributed to the ester comonomer is about 5 to about 50 weight percent, preferably about 15 to about 40 weight percent, based on the weight of the copolymer. An example includes ELVAX 265, an ethylene-vinyl acetate copolymer that is not made with a molecular catalyst.

SUMMARY

We recognized that VALDISERRI's ethylene polymers, PARENT's isotactic-polypropylene, and the 7.3 mole percent octene comonomeric content of CHAUDHARY's metallocene-catalyzed ethylene-octene copolymer example sometimes lack sufficient flexibility for use as a flexible product, such as flexible electrical insulation. They may also lack sufficient heat or oxidative stability for use in medium-to-ultra-high voltage power cables.

We recognized that coverings (e.g., single layer coverings or multilayer coverings) of incumbent insulated electrical/optical conductors that have been exposed to heat for a prolonged period of time become less flexible, are prone to oxidize and embrittle. There is a need for a new crosslinked polyolefin material that exhibits sufficient flexibility, heat or oxidative stability, and dissipation factor for use as a single layer covering or multilayer covering, e.g., an improved crosslinked polyolefin insulation layer of the multilayer covering of the insulated electrical/optical conductor, especially in power cables for medium-to-ultra-high voltage applications. Our problem, then, would be to formulate a new curable polyolefin composition that, when cured, produces a new crosslinked polyolefin material that has enhanced (i.e., increased) flexibility, enhanced (increased) heat and/or oxidative stability, and/or enhanced (decreased) dissipation factor. For heat and/or oxidative stability characterization, tensile elongation retained (TER) after heat aging and/or oxidative induction time (OIT) may be measured. The TER after heat aging may be tensile elongation retained after 7 days at 136° C. or after 28 days at 136° C., measured according to the procedure described later ("TER (7 d, 136° C.)" or "TER (28 d, 136° C.)"), collectively "TER (7 d or 28 d, 136° C.)". The oxidative induction time may be measured in molecular oxygen atmosphere at 185° C., according to the procedure described later ("OIT ($O_2$, 185° C.)"). As for dissipation factor characterization, it may be measured at 130° C., 60 Hertz (Hz), and 2 kilovolts (kV) according to the procedure described later using ASTM D150, ("DF (130° C., 60 Hz, 2 kV)").

Our technical solution to this problem includes a new peroxide-curable ethylene copolymer composition (inventive composition) comprising (A) a crosslinkable ethylene/alpha-olefin copolymer, (B) an effective amount of triallyl phosphate (TAP), and (C) an organic peroxide. The (A) crosslinkable ethylene/alpha-olefin copolymer is made by a process comprising copolymerizing ethylene and an olefin-functional comonomer, and optionally another comonomer selected from a non-conjugated diene and a second alpha-olefin, in the presence of a molecular catalyst useful therefor. Also included is a new crosslinked ethylene/alpha-olefin copolymer (inventive crosslinked product) made by curing the inventive composition. The inventive crosslinked product has sufficient, even enhanced (i.e., increased), flexibility, enhanced (i.e., increased) heat and oxidative stability, and enhanced (i.e., decreased) dissipation factor for use as a single layer covering or a multilayer covering, e.g., the crosslinked polyolefin insulation layer of the multilayer covering of the insulated electrical/optical conductor. Our technical solution also includes methods of making and using the inventive composition and articles comprising or made from the inventive composition or crosslinked product. The inventive composition and crosslinked product are useful for making a single layer covering or a multilayer covering, e.g., a crosslinked polyolefin insulation layer of a multilayer covering of an insulated electrical/optical conductor. Also included is the crosslinked polyolefin insulation layer made from the inventive composition or crosslinked product, the single or multilayer covering (e.g., the multilayer covering containing the crosslinked polyolefin insulation layer), and the insulated electrical/optical conductor containing the single or multilayer covering. The insulated electrical/optical conductor is useful for data- and/or electricity-transmitting/distributing applications, including low, medium, high, and ultra-high voltage applications.

DETAILED DESCRIPTION

The Summary and Abstract are incorporated here by reference. The inventive crosslinked product is characterized as being a TAP-grafted ethylene/alpha-olefin copolymer. The copolymer is made by a free radical process that forms covalent bonds between TAP molecules and the crosslinkable ethylene/alpha-olefin copolymer. The free radical process involves free radicals that are initiated or propagated by a free radical generator compound such as a peroxide or by other means of generating free-radicals such as electron-beam irradiation. The inventive crosslinked product or copolymer (A) may exhibit any gel content (as measured, for instance, by decalin extraction) ranging from 0 to 100 wt %. All flexural modulus values are measured at 23° C. unless stated otherwise.

To enable the technical solution, the effective amount of (B) TAP may be from 0.950 to 5.00 weight percent (wt %) of the (B) TAP, based on total weight of the inventive composition. E.g., (B) TAP may be from 1.05 to 4.54 wt %, alternatively 1.090 to 4.00 wt %, alternatively 1.100 to 3.00 wt % of the inventive composition. After the inventive composition is cured the resulting inventive crosslinked product may be characterized by an enhanced (i.e., increased) TER (7 d or 28 d, 136° C.), an enhanced (i.e., increased) OIT ($O_2$, 185° C.), and an enhanced (i.e., decreased) DF (130° C., 60 Hz, 2 kV), all relative to a TAP-free comparative composition and TAP-free comparative crosslinked product made therefrom. In addition, if TAP is present in a more TAP-containing comparative composition at 5.01 wt % or greater, based on total weight of the more TAP-containing comparative composition, after curing the more TAP-containing comparative composition the resulting more-TAP comparative crosslinked product may be characterized by no further enhancement of at least one of TER (7 d or 28 d, 136° C.), OIT ($O_2$, 185° C.), and DF (130° C., 60 Hz, 2 kV) and may be less economical for industrial uses. Further, at greater than 5.0 wt % TAP, curing the more TAP-containing comparative composition may undesirably leave unreacted TAP in the resulting more-TAP comparative crosslinked product. If TAP is present in a first less TAP-containing comparative composition at >0 to less than 0.050 wt %, based on total weight of the first less TAP-containing comparative composition, after curing the first less TAP-containing comparative composition the resulting first less-TAP comparative crosslinked product may be characterized by TER (7 d or 28 d, 136° C.) or OIT ($O_2$, 185° C.) that may not be sufficiently enhanced (i.e., insufficiently increased) for use in flexible electrical insulation for medium-to-ultra-high power cables. If TAP is present in a second less TAP-containing comparative composition at >0.050 to less than 0.95 wt %, based on total weight of the second less TAP-containing comparative composition, after the second less TAP-containing comparative composition is cured the resulting second less-TAP comparative crosslinked product may be characterized by enhanced TER (7 d or 28 d, 136° C.) and enhanced OIT ($O_2$, 185° C.), but the DF (130° C., 60 Hz, 2 kV) may be unenhanced (i.e., unchanged) or less than three times worsened (i.e., from >1× to less than 3× increased).

Aspect 1. A peroxide-curable ethylene copolymer composition comprising 54.00 to 99.00 weight percent (wt %) of (A) a crosslinkable ethylene/alpha-olefin copolymer ("copolymer (A)" or "constituent (A)"), which is made by a process comprising copolymerizing ethylene and an alpha-olefin comonomer, and optionally another comonomer selected from a non-conjugated diene and a second alpha-olefin, in the presence of a molecular catalyst useful therefor, and which (A) crosslinkable ethylene/alpha-olefin copolymer is characterized by at least one of, alternatively two of, alternatively each of properties (a) to (d): (a1) a flexural modulus (2% secant) of from >0 to 6,500 psi (>0 to 45 MPa), alternatively from >0 to 5,000 psi (>0 to 34 MPa) measured according to ASTM D790-15e2 and/or (a2) a density from 0.850 to 0.890 grams per cubic centimeter (g/cm$^3$), alternatively from 0.850 to 0.887 g/cm$^3$, measured according to ASTM D792, (b) a glass transition temperature ($T_g$) of −130° to −20° C. measured by differential scanning calorimetry (DSC) according to ASTM 3418-15, (c) a melt index (190° C., 2.16 kilograms (kg), "$I_2$") of 0.5 decigram per minute (dg/min.) to 50 dg/min. measured according to ASTM D1238-04, and (d) a Mooney Viscosity (ML1+4 at 125° C.) from 15 to 170 measured according to ASTM D1646-15, with a 1 minute preheat time and a 4 minutes rotor operation time; from 0.950 to 5.00 wt % of (B) triallyl phosphate (TAP); from 0.050 to 5.00 wt % of (C) an organic peroxide; and from 0.00 to 40 wt %, alternatively 0.00 to 20 wt %, alternatively 0.00 wt %, alternatively >0.00 to 10 wt % of (D) a supplemental polymer selected from an ethylene/unsaturated carboxylic ester copolymer, a polyethylene homopolymer, a Non-(molecular catalyst)-formed ethylene/alpha-olefin copolymer, and a propylene-based polymer; with the proviso that the total weight of constituent (A) and constituent (D) is 80.00 to 99.00 wt %, alternatively 90.0 to 99.00 wt %, alternatively 90.00 to 96.0 wt %; wherein all wt % are based on total weight of the peroxide-curable ethylene copolymer composition and wherein total weight of the peroxide-curable ethylene copolymer composition is 100.0 wt %. When in certain embodiments a sum of the wt % of constituents (A) to (C), alternatively (A) to (D), is less than 100.00 wt %, the composition further contains at least one additional constituent, such as constituent (D) or at least one of constituents (E) to (O), respectively, described later. Typically, the copolymerizing ethylene and the alpha-olefin comonomer, and optionally another comonomer selected from a non-conjugated diene and a second alpha-olefin, to make the (A) crosslinkable ethylene/alpha-olefin copolymer is done in the absence of a Ziegler-Natta catalyst.

Aspect 2. The peroxide-curable ethylene copolymer composition of aspect 1 further described by any one of limitations (i) to (ii): (i) the alpha-olefin comonomer is a ($C_3$-$C_{20}$) alpha-olefin and the (A) crosslinkable ethylene/alpha-olefin copolymer is an ethylene-($C_3$-$C_{20}$)alpha-olefin copolymer (e.g., bipolymer (copolymerizing without the another comonomer) or terpolymer (copolymerizing with the second alpha-olefin comonomer)) that is characterized by at least one of, alternatively two of, alternatively each of the properties (a) to (c): (a1) a flexural modulus (2% secant) of from >0 to 6,500 psi (>0 to 45 MPa), alternatively from >0 to 5,000 psi (>0 to 34 MPa) measured according to ASTM D790-15e2 and/or (a2) a density from 0.850 to 0.890 g/cm$^3$, alternatively 0.850 to 0.887 g/cm$^3$ measured according to ASTM D792; (b) a glass transition temperature ($T_g$) of −130° to −20° C. measured by differential scanning calorimetry (DSC) according to ASTM 3418-15, and (c) a melt index (190° C., 2.16 kilograms (kg), "$I_2$") of 0.5 decigram per minute (dg/min.) to 50 dg/min. measured according to ASTM D1238-04; or (ii) the alpha-olefin comonomer is propylene and the another comonomer is used and is a non-conjugated ($C_6$-$C_{20}$)diene and the (A) crosslinkable ethylene/alpha-olefin copolymer is an ethylene-propylene-($C_6$-$C_{20}$)diene copolymer (e.g., terpolymer) (EPDM) that is characterized by at least one of, alternatively two of, alternatively each of the properties (a) to (d): (a1) a flexural modulus (2% secant) of from >0 to 6,500 psi (>0 to 45 MPa), alternatively from >0 to 5,000 psi (>0 to 34 MPa) measured according to ASTM D790-15e2 and/or (a2) a density from 0.850 to 0.890 g/cm$^3$, alternatively 0.850 to 0.887 g/cm$^3$ measured according to ASTM D792; (b) a glass transition temperature ($T_g$) of −130° to −20° C. measured by differential scanning calorimetry (DSC) according to ASTM 3418-15, (c) a melt index (190° C., 2.16 kilograms (kg), "$I_2$") of 0.1 decigram per minute (dg/min.) to 50 dg/min. measured according to ASTM D1238-04, and (d) a Mooney Viscosity (ML1+4 at 125° C.) from 15 to 170 measured according to ASTM D1646-15, with a 1 minute preheat time and a 4 minutes rotor operation time. In some aspects the copolymer (A) is free of covalently bonded silicon atoms. In other aspects the copolymer (A) further contains hydrolyzable silyl functional groups (e.g., trimethoxysilyl groups) and the copolymer (A) is characterized as being an ethylene/alpha-olefin/olefin-functional hydrolyzable silane copolymer. The ethylene/alpha-olefin/olefin-functional hydrolyzable silane copolymer may be made as described later.

Aspect 3. The peroxide-curable ethylene copolymer composition of aspect 1 or 2 further described by any one of limitations (i) to (iv): (i) the (A) crosslinkable ethylene/alpha-olefin copolymer is from 90 to 99 wt %, alternatively 91 to 98 wt %, alternatively 93 to 97 wt % peroxide-curable ethylene copolymer composition, and the peroxide-curable ethylene copolymer composition is free of (lacks) the (D) supplemental polymer; (ii) the (A) crosslinkable ethylene/alpha-olefin copolymer is from 58.00 to 90.00 wt %, alternatively 80.0 to 90.0 wt %, alternatively 85.0 to 90.0 wt % of peroxide-curable ethylene copolymer composition and the (D) supplemental polymer is from 40.0 to 1.0 wt %, alternatively from 10.0 to 1.0 wt %, alternatively from 10.0 to 7.0 wt %, respectively, of the peroxide-curable ethylene copolymer composition; (iii) the (D) supplemental polymer is present and is a polypropylene homopolymer; and (iv) both (ii) and (iii). All wt % are based on total weight of the peroxide-curable ethylene copolymer composition.

Aspect 4. The peroxide-curable ethylene copolymer composition of any one of aspects 1 to 3 further described by any one of limitations (i) to (iv): (i) the (B) triallyl phosphate (TAP) is from 1.01 to 4.54 wt %; (ii) the (B) triallyl phosphate (TAP) is from 1.05 to 4.00 wt %; (iii) the (B) triallyl phosphate (TAP) is from 1.10 to 3.00 wt %; (iv) the (B) triallyl phosphate (TAP) is from 1.50 to 4.600 wt %; wherein all wt % are based on total weight of the peroxide-curable ethylene copolymer composition.

Aspect 5. The peroxide-curable ethylene copolymer composition of any one of aspects 1 to 4 further described by any one of limitations (i) to (v): (i) the (C) organic peroxide is from 1.0 to 4.0 wt %, alternatively from 1.5 to 3.0 wt %, alternatively from 1.9 to 2.4 wt %, all wt % based on total weight of the peroxide-curable ethylene copolymer composition; (ii) the (C) organic peroxide is a compound of formula $R^O$—O—O—$R^O$, wherein each $R^O$ independently is a ($C_1$-$C_{20}$)alkyl group or ($C_6$-$C_{20}$)aryl group; (iii) the (C) organic peroxide is bis(1,1-dimethylethyl) peroxide; bis(1,1-dimethylpropyl) peroxide; 2,5-dimethyl-2,5-bis(1,1-dimethylethylperoxy) hexane; 2,5-dimethyl-2,5-bis(1,1-dimethylethylperoxy) hexyne; 4,4-bis(1,1-dimethylethylperoxy) valeric acid; butyl ester; 1,1-bis(1,1-dimethylethylperoxy)-3,3,5-trimethylcyclohexane; benzoyl peroxide; tert-butyl peroxybenzoate; di-tert-amyl peroxide ("DTAP"); bis(alpha-t-butyl-peroxyisopropyl) benzene ("BIPB"); isopropylcumyl t-butyl peroxide; t-butylcumylperoxide; di-t-butyl peroxide; 2,5-bis(t-butylperoxy)-2,5-dimethylhexane; 2,5-bis(t-butylperoxy)-2,5-dimethylhexyne-3,1,1-bis(t-butylperoxy)-3,3,5-trimethylcyclohexane; isopropylcumyl cumylperoxide; butyl 4,4-di(tert-butylperoxy) valerate; or di(isopropylcumyl) peroxide; or dicumyl peroxide; (iv) the (C) organic peroxide is dicumyl peroxide; and (v) a combination of (i) and any one of (ii) to (iv).

Aspect 6. The peroxide-curable ethylene copolymer composition of any one of aspects 1 to 5 further described by limitation (i) or (ii): (i) wherein the total amount of constituents (A) to (D) is 100 wt % thereof; or (ii) wherein the total amount of constituents (A) to (D) is less than 100 wt % and the peroxide-curable ethylene copolymer composition further comprises at least one of constituents (E) to (O): (E) an antioxidant; (F) a coagent that is not TAP; (G) a polydimethylsiloxane (PDMS) fluid; (H) a hindered amine stabilizer; (I) a flame retardant; (J) a tree retardant; (K) a colorant; (L) a liquid aromatic or saturated hydrocarbon (LASH); (M) a methyl radical scavenger; (N) a scorch retardant; and (O) a filler. In some aspects the peroxide-curable ethylene copolymer composition further comprises at least one of, alternatively each of (E) antioxidant, (F) coagent that is not TAP, (H) hindered amine stabilizer, and (J) tree retardant. In some aspects the peroxide-curable ethylene copolymer composition does not further comprise at least one, alternatively each of the constituents (G) PDMS fluid, (I) flame retardant, (K) colorant, (L) liquid aromatic or saturated hydrocarbon (LASH); (M) methyl radical scavenger; (N) scorch retardant; and (O) filler.

Aspect 7. The peroxide-curable ethylene copolymer composition of aspect 6 further described by any one of limitations (i) to (vi): (i) the peroxide-curable ethylene copolymer composition further comprises constituent (E) antioxidant and the (E) antioxidant is bis(4-(1-methyl-1-phenylethyl) phenyl)amine; 2,2'-methylene-bis(4-methyl-6-t-butylphenol); 2,2'-thiobis(2-t-butyl-5-methylphenol; 2,2'-thiobis(6-t-butyl-4-methylphenol; tris[(4-tert-butyl-3-hydroxy-2,6-dimethylphenyl)methyl]-1,3,5-triazine-2,4,6-trione; pentaerythritol tetrakis(3-(3,5-bis(1,1-dimethylethyl)-4-hydroxyphenyl)propionate; 3,5-bis(1,1-dimethylethyl)-4-hydroxybenzenepropanoic acid 2,2'-thiodiethanediyl ester; or distearyl thiodipropionate; (ii) the peroxide-curable ethylene copolymer composition further comprises constituent (F) coagent that is not TAP and the (F) coagent that is not TAP is triallyl isocyanurate (TAIC); an unsaturated organophosphorous compound such as triallyl phosphoric triamide, N-hydroxymethyl-3-dimethylphosphonopropionamide, 2-ethyl-methacrylate phosphoric acid, phosphate ester of hydroxyl ethyl methacrylate, or vinyl phosphonic acid; or alpha-methyl styrene dimer (AMSD) or diisopropenylbenzene (DIPB); (iii) the peroxide-curable ethylene copolymer composition further comprises constituent (H) hindered amine stabilizer and the (H) hindered amine stabilizer is 1,3,5-triazine-2,4,6-triamine, N2,N2''-1,2-ethanediylbis [N2-[3-[[4,6-bis[butyl(1,2,2,6,6-pentamethyl-4-piperidinyl) amino]-1,3,5-triazin-2-yl]amino]propyl]-N',N''-dibutyl-N', N''-bis(1,2,2,6,6-pentamethyl-4-piperidinyl)-; (iv) the peroxide-curable ethylene copolymer composition further comprises constituent (J) tree retardant and the (J) tree retardant is a poly(ethylene glycol) (PEG) with a number-average molecular weight ($M_n$) of 10,000 to 30000 grams/mole; (v) the peroxide-curable ethylene copolymer composition further comprises a combination of limitations (i) to (iv); and (vi) the peroxide-curable ethylene copolymer composition further comprises from 0.20 to 0.50 wt % constituent (E) wherein (E) is 2,2'-thiobis(2-t-butyl-5-methylphenol, from 0.30 to 0.50 wt % constituent (F) wherein (F) is alpha-methyl styrene dimer (AMSD), from 0.10 to 0.30 wt % constituent (H) wherein (H) is 1,3,5-triazine-2,4,6-triamine, N2,N2"-1,2-ethanediylbis[N2-[3-[[4,6-bis[butyl(1,2,2,6,6-pentamethyl-4-piperidinyl)amino]-1,3,5-triazin-2-yl]amino]propyl]-N',N"-dibutyl-N',N"-bis(1,2,2,6,6-pentamethyl-4-piperidinyl)-, and from 0.40 to 0.80 wt % constituent (J) wherein (J) is a PEG having a $M_n$ of 15000 to 25000 g/mol.

Aspect 8. The peroxide-curable ethylene copolymer composition of any one of aspects 1-7, wherein the (A) crosslinkable ethylene/alpha-olefin copolymer is an ethylene/propylene/diene terpolymer and the diene is 5-ethylidene-2-norbornene.

Aspect 9. A method of making a peroxide-curable ethylene copolymer composition of any one of aspects 1 to 8, the method comprising contacting effective amounts of constituents (A) to (C), and any optional constituents (D) to (O), to give the peroxide-curable ethylene copolymer composition. In some aspects the method is conducted according to Preparation Method 1 described later.

Aspect 10. The method of aspect 9 wherein the contacting comprises internal mixing the constituents (A) to (C) and any optional constituents (D) to (O) or soaking at least one of the constituents (B), (C), and any optional constituents (D) to (O) into constituent (A). The soaking is a passive method that is free of agitating such as melt mixing.

Aspect 11. A crosslinked ethylene/alpha-olefin copolymer product that is a product of curing the peroxide-curable ethylene copolymer composition any one of aspects 1 to 8.

Aspect 12. The crosslinked ethylene/alpha-olefin copolymer product of aspect 11 wherein the (A) crosslinkable ethylene/alpha-olefin copolymer is an ethylene/propylene/diene terpolymer and the diene is 5-ethylidene-2-norbornene and the crosslinked ethylene/alpha-olefin copolymer product has a tensile elongation from 30% to 90% after being heated at 177° C. in an oven for 3 days (72 hours) or a tensile elongation retention from 15% to 80% after being heated at 177° C. in an oven for 7 days (168 hours). 1 day=24 hours. 1 hour=60 minutes. 1 minute=60 seconds.

Aspect 13. A manufactured article comprising a shaped form of the crosslinked ethylene/alpha-olefin copolymer product of aspect 11 or 12.

Aspect 14. A coated conductor comprising a conductive core and an insulation layer at least partially covering the conductive core, wherein at least a portion of the insulation layer comprises the crosslinked ethylene/alpha-olefin copolymer product of aspect 11 or 12. The insulation layer may be a single layer covering or multilayer covering the conductive core. The coated conductor may be an insulated electrical conductor/optical as generally described in the Introduction, which description is hereby incorporated by reference, except wherein the crosslinked polyolefin insulation layer of the multilayer covering of the insulated electrical/optical conductor is comprised of the inventive crosslinked product. The inventive insulated electrical/optical conductor may be an insulated electrical conductor and useful for transmitting electricity.

Aspect 15. A method of conducting electricity, the method comprising applying a voltage across the conductive core of the coated conductor of aspect 14 so as to generate a flow of electricity through the conductive core.

The peroxide-curable ethylene copolymer composition (inventive composition, e.g., of aspects 1 to 7). The total weight of all constituents is 100 wt %. The inventive composition is substantially free of, alternatively does not contain, a polyolefin other than constituent (A) or constituents (A) and (D). E.g., is substantially from or, alternatively does not contain, an ethylene/unsaturated carboxylic ester copolymer, a poly($C_4$-$C_{40}$)alpha-olefin homopolymer, or a polystyrene. Otherwise the inventive composition may contain additional polymers as long as any additional polymers do not completely negative the technical solution. In this context, consisting essentially of means that the inventive composition contains 0 to 1 wt %, alternatively 0 to <0.1 wt %, alternatively 0 wt % of any other polymer, not counting constituents (A) to (O).

The peroxide-curable ethylene copolymer composition contains the constituents (A) to (C), described in more detail later. The peroxide-curable ethylene copolymer composition contains (A) crosslinkable ethylene/alpha-olefin copolymer, which are crosslinkable macromolecules having ethylene-derived monomeric units and alpha-olefin comonomeric units. The (A) may consist of carbon and hydrogen atoms and, optionally, silicon atoms and silicon-bonded oxygen atoms. The (A) may be substantially free or free of other heteroatoms (e.g., halogen, N, S, P). Under curing conditions (typically comprising heating to a temperature above 160° C., alternatively above 180° C.) the (C) organic peroxide forms oxygen-radicals. The O-radicals abstract hydrogen atoms from interior carbon atoms in backbones or side chains of the (A) crosslinkable ethylene/alpha-olefin copolymer, thereby generating internal polymeric chain free radicals on carbon atoms. The carbon radicals couple to form the crosslinked ethylene/alpha-olefin copolymer. The crosslinking occurs via a curing reaction under curing conditions, thereby forming the crosslinked ethylene/alpha-olefin copolymer, which is a networked polymer.

The peroxide-curable ethylene copolymer composition may be a one-part formulation, alternatively a two-part formulation, alternatively a three-part formulation. The one-part formulation comprises constituents (A) to (C), and any optional constituents such as constituents (D) to (O), in a single mixture, which is the peroxide-curable ethylene copolymer composition. The two-part formulation may comprise first and second parts, wherein the first part consists essentially of (A) crosslinkable ethylene/alpha-olefin copolymer and, optionally, (D) supplemental polymer, and wherein the second part consists essentially of an additive masterbatch composition containing at least one of constituents (B) to (C), and any optional constituents such as additives (D) to (O). The remaining constituents (B) to (C), and any optional constituents such as additives (D) to (O), may be in the first part or the second part or both. The peroxide-curable ethylene copolymer composition may be made from the two-part formulation by combining the first and second parts to give an admixture thereof as the peroxide-curable ethylene copolymer composition. The three-part formulation may be the same as the two-part formulation except that constituent (C) and, optionally, any (G) PDMS fluid are not in the first or second parts, but constituent (C) organic peroxide, and optionally constituent (G) PDMS fluid comprise(s) a third part. When (C), and optionally (G) comprise(s) a third part, the peroxide-curable ethylene copolymer composition may be made by combining the first and second parts to give an admixture thereof containing constituents (A), (B), any (D), and optionally any constituents (H) to (O); if desired optionally pelletizing the admixture to give the admixture in the form of pellets; and then contacting the admixture (e.g., pellets) of the first and second parts with the third part (i.e., (C) organic peroxide, and optionally (G) PDMS fluid to give the peroxide-curable ethylene copolymer composition. Generally, the combining or mixing (contacting) of constituents (A) to (C), optionally (D), and any optional constituents such as additives (E) to (O), may be carried out at a temperature from about 20° to 100° C. for 2 to 100 hours, e.g., 50° to 80° C. for 6 to 24 hours. Higher temperatures may be used when combining constituents (A), (B), optionally (D), and any constituents (E) to (O), to give an admixture in the absence of (C) organic peroxide, and thereafter the admixture may be cooled to a temperature below a curing temperature before being combined or contacted with (C) organic peroxide. There is no inherent reason why any combination of constituents (A) to (C) and optional (D), and any optional constituents (D) to (O), cannot be in either the one-part formulation or the first part or the second part of the two-part formulation. There generally aren't any incompatibilities amongst (A) to (O).

In some aspects the (A) crosslinkable ethylene/alpha-olefin copolymer of any one of embodiments (i) to (v) of aspect 2 is characterized as a hydrolyzable silane-grafted crosslinkable ethylene/alpha-olefin copolymer made by post-reactor grafting of the olefin-functional hydrolyzable silane (e.g., vinyl trimethoxysilane) onto the copolymer (A) of any one of the foregoing embodiments (i) to (iv).

In some aspects the (A) crosslinkable ethylene/alpha-olefin copolymer of any one of embodiments (i) to (ii) of aspect 2 is characterized by at least one of, alternatively two of, alternatively each of properties (a) to (c): (a1) flexural modulus (2% secant) from 500 to 6,500 psi (3 to 45 MPa), alternatively 500 to 6,000 psi (3 to 41 MPa), alternatively 500 to 5,000 psi (3 to 34 MPa), alternatively 500 to 4,501 psi (3 to 31 MPa), alternatively from 500 to 4001 psi (3 to 28 MPa), alternatively 500 to 3501 psi (3 to 24 MPa), alternatively 900 to 2010 psi (6 to 14 MPa), all measured according to ASTM D790-15e2 and/or (a2) density of 0.850 to 0.890 g/cm$^3$, alternatively 0.850 to 0.888 g/cm$^3$, alternatively 0.850 to 0.887 g/cm$^3$, alternatively 0.850 to 0.885 g/cm$^3$, alternatively 0.850 to 0.880 g/cm$^3$, alternatively 0.850 to 0.875 g/cm$^3$, alternatively 0.870 to 0.875 g/cm$^3$, all measured according to ASTM D792; (b) $T_g$ is −120° to −30° C., alternatively −110° to −50° C., measured by DSC according to ASTM 3418-15; (c) melt index (190° C., 2.16 kilograms (kg), "$I_2$") from 0.3 to 30 dg/min., alternatively 0.5 to 20.0 dg/min., measured according to ASTM D1238-04. In some aspects the (A) crosslinkable ethylene/alpha-olefin copolymer of any one of embodiments (i) to (ii) is independently further characterized by property (e) being curable with dicumyl peroxide, but in absence of TAP, to a TAP-free comparative crosslinked ethylene/alpha-olefin copolymer having a DF (130° C., 60 Hz, 2 kV) of greater than 0.1%, alternatively greater than 0.3%, alternatively greater than 0.5%. In some aspects (A) is characterized by property (a1); alternatively property (a2); alternatively property (b); alternatively property (c); alternatively properties (a1) and (a2); alternatively properties (a1) or (a2) and (b); alternatively properties (a1) or (a2) and (c); alternatively properties (a1), (a2), (b), and (c).

The constituent (A): the crosslinkable ethylene/alpha-olefin copolymer. A "copolymer" is a macromolecule or collection of macromolecules having monomeric units, made by polymerizing a monomer, and one or more different types of comonomeric units, made by polymerizing one or more different alpha-olefin comonomers and optionally a non-conjugated diene. Monomers and comonomers are polymerizable molecules. A monomeric unit, also called a monomer unit or "mer", is the largest constitutional unit contributed by (derived from) a single monomer molecule to the structure of the macromolecule(s). A comonomeric unit is the largest constitutional unit contributed by (derived from) a single comonomer molecule to the structure of the macromolecule(s). Each unit is typically divalent. A "bipolymer" is a copolymer made from a monomer and one comonomer. A "terpolymer" is a copolymer made from a monomer and two different comonomers. An "ethylene/alpha-olefin copolymer" is such a copolymer wherein the monomeric units are derived from the monomer ethylene ($CH_2=CH_2$) and comprise on average per molecule, at least 50 weight percent of the macromolecules and the comonomeric units are derived from at least one alpha-olefin comonomer and, optionally, a second alpha-olefin comonomer or a non-conjugated ($C_6$-$C_{20}$)diene. Each comonomer may independently have hydrogen atoms and from 3 to 20 carbon atoms per molecule. The (A) crosslinkable ethylene/alpha-olefin copolymer may be in a bulk form of granules or pellets.

In some of the above aspects the alpha-olefin comonomer may be the ($C_3$-$C_{20}$)alpha-olefin, alternatively a ($C_4$-$C_{20}$) alpha-olefin, alternatively a ($C_4$-$C_8$)alpha-olefin. The (A) crosslinkable ethylene/alpha-olefin copolymer may be a corresponding ethylene-($C_3$-$C_{20}$)alpha-olefin copolymer (e.g., bipolymer or terpolymer), each independently characterized by at least one of, alternatively two of, alternatively each of the properties (a) to (c) and, optionally, (d). The ethylene-($C_3$-$C_{20}$)alpha-olefin bipolymer consists essentially of ethylene-derived monomeric units and ($C_3$-$C_{20}$) alpha-olefin-derived comonomeric units. The ethylene-($C_3$-$C_{20}$)alpha-olefin terpolymer consists essentially of ethylene-derived monomeric units, first ($C_3$-$C_{20}$)alpha-olefin-derived comonomeric units, and second ($C_3$-$C_{20}$)alpha-olefin-derived comonomeric units. The first ($C_3$-$C_{20}$)alpha-olefin-derived comonomeric units are derived from a first ($C_3$-$C_{20}$) alpha-olefin and the second ($C_3$-$C_{20}$)alpha-olefin-derived comonomeric units are derived from a second ($C_3$-$C_{20}$) alpha-olefin, wherein the first and second ($C_3$-$C_{20}$)alpha-olefins are different (e.g., the first ($C_3$-$C_{20}$)alpha-olefin is propylene and the second ($C_3$-$C_{20}$)alpha-olefin is 1-hexene). The ethylene monomeric units may be from 99 to 51 wt %, alternatively from 95 to 60 wt %, alternatively 90 to 70 wt % of the ethylene-($C_3$-$C_{20}$)alpha-olefin bipolymer, or a single point permutation thereof such as from 99 to 70 wt % or from 90 to 60 wt %. The ($C_3$-$C_{20}$)alpha-olefin comonomeric units may be from 1 to 49 wt %, alternatively 5 to 40 wt %, alternatively 10 to 30 wt % of the ethylene-($C_3$-$C_{20}$) alpha-olefin bipolymer, or a single point permutation thereof such as from 1 to 30 wt % or from 10 to 40 wt %. The wt % values are on average per molecule of the ethylene-($C_3$-$C_{20}$)alpha-olefin bipolymer. The alpha-olefin comonomer contains only one carbon-carbon double bond (C=C), which is located at a terminal carbon atom. The ($C_3$-$C_{20}$) alpha-olefin may be a ($C_4$-$C_8$)alpha-olefin and the ethylene-($C_3$-$C_{20}$)alpha-olefin copolymer may be an ethylene-($C_4$-$C_8$) alpha-olefin bipolymer characterized by at least one of, alternatively two of, alternatively each of the properties (a) to (c) and, optionally, (e). The ($C_3$-$C_{20}$)alpha-olefin may be linear, branched, or cyclic-containing. In some aspects the ($C_3$-$C_{20}$)alpha-olefin is a ($C_3$-$C_{10}$)alpha-olefin, alternatively ($C_4$-$C_8$)alpha-olefin, alternatively ($C_{10}$-$C_{20}$)alpha-olefin. Examples of suitable ($C_3$-$C_{20}$)alpha-olefins are propene, 1-butene, 1-pentene, 1-hexene, 4-methyl-1-pentene, 1-octene, 1-decene, 1-dodecene, 1-tetradecene, 1-hexadecene, and 1-octadecene. The $(C_3-C_{20})$alpha-olefin is unsubstituted or substituted with a cycloalkyl group on a saturated (spa) carbon atom such as 3-cyclohexyl-1-propene and vinylcyclohexane. Examples of the ethylene-$(C_3-C_{20})$alpha-olefin bipolymers are ethylene/propylene bipolymers, ethylene/1-butene bipolymers, ethylene/1 hexene bipolymers, and ethylene/1-octene bipolymers. Examples of the ethylene-$(C_3-C_{20})$alpha-olefin terpolymers are ethylene/propylene/1-octene terpolymers, ethylene/propylene/1-butene terpolymers, and ethylene/1-butene/1-octene terpolymers. The ethylene-$(C_3-C_{20})$alpha-olefin copolymer may be an ethylene-(1-octene) bipolymer. Example of a suitable ethylene-$(C_3-C_{20})$alpha-olefin copolymer is a molecular catalyst-made ethylene-1-octene copolymer characterized by a density of 0.872 g/cm3 measured according to ASTM D792; a melt index (190° C., 2.16 kg) of 4.8 g/10 min. measured according to ASTM D1238; a flexural modulus (2% secant) of 1570 psi (10.8 MPa) measured according to ASTM D790-15e2; and a glass transition temperature $(T_g)$ of −53° C. measured by differential scanning calorimetry (DSC) according to ASTM 3418-15; obtained as Developmental XUS 38660.00 Polyolefin Elastomer by The Dow Chemical Company.

In some of the above aspects the comonomers used to make the (A) crosslinkable ethylene/alpha-olefin copolymer may be the combination of propylene and a non-conjugated $(C_6-C_{20})$diene and the (A) crosslinkable ethylene/alpha-olefin copolymer may be the ethylene-propylene-$(C_4-C_{20})$ diene terpolymer (EPDM) characterized by at least one of, alternatively two of, alternatively each of the properties (a) to (d) and, optionally, (e). The EPDM consists essentially of ethylene-derived monomeric units, propylene-derived comonomeric units, and non-conjugated $(C_6-C_{20})$diene-derived comonomeric units. The ethylene monomeric units may be from 99 to 51 wt %, alternatively from 95 to 60 wt %, alternatively 90 to 70 wt % of the EPDM, or a single point permutation thereof such as from 99 to 70 wt % or from 90 to 60 wt %. The ethylenic monomeric unit wt % may be measured according to ASTP D3900. The $(C_3-C_{20})$ alpha-olefin comonomeric units may be from 1 to 48.1 wt %, alternatively 5 to 39.1 wt %, alternatively 10 to 29.1 wt % of the EPDM, or a single point permutation thereof such as from 1 to 39.1 wt % or from 10 to 48.1 wt %. The non-conjugated $(C_6-C_{20})$diene may be from 0.1 to 10.0 wt %, alternatively from 0.2 to 5.0 wt %, alternatively 0.3 to 3.0 wt % of the EPDM. The wt % values are on average per molecule of the EPDM. The total weight of ethylene, propylene, and non-conjugated $(C_6-C_{20})$diene units is 100 wt % of the EPDM. The non-conjugated $(C_6-C_{20})$diene contains only two carbon-carbon double bonds. The C=C of the $(C_6-C_{20})$diene are non-conjugated. In some aspects the $(C_6-C_{20})$diene is a non-conjugated $(C_6-C_{15})$diene, alternatively a non-conjugated $(C_6-C_8)$diene. Examples of suitable non-conjugated $(C_6-C_{20})$dienes are 1,4-hexadiene, 1,6-octadiene, 1,7-octadiene, 1,9-decadiene; branched-chain acyclic dienes, such as 5-methyl-1,4-hexadiene, 3,7-dimethyl-1,6-octadiene, 3,7-dimethyl-1,7-octadiene, and mixed isomers of dihydromyricene and dihydroocinene; single-ring alicyclic dienes, such as 1,3-cyclopentadiene, 1,4-cyclohexadiene, 1,5-cyclooctadiene, and 1,5-cyclododecadiene; and multi-ring alicyclic fused and bridged-ring dienes, such as tetrahydroindene, methyl tetrahydroindene, dicyclopentadiene, and bicyclo-(2,2,1)-hepta-2,5-diene; alkenyl, alkylidene, cycloalkenyl, and cycloalkylidene norbornenes, such as 5-ethylidene-2-norbornene, 5-methylene-2-norbornene, 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene. In some aspects the non-conjugated $(C_6-C_{20})$ diene is 1,4-hexadiene ("HD"), 5-ethylidene-2-norbornene ("ENB"), 5-vinylidene-2-norbornene ("VNB"), 5-methylene-2-norbornene ("MNB"), or dicyclopentadiene ("DCPD"). In other aspects the non-conjugated $(C_6-C_{20})$ diene is 1,4-hexadiene, or 1,7-octadiene. The non-conjugated $(C_6-C_{20})$diene may be 1,4-hexadiene, 1,6-hexadiene, dicyclopentadiene, ethylidene norbornene, or vinyl norbornene; and the (A) crosslinkable ethylene/alpha-olefin terpolymer may be an ethylene-propylene-1,4-butadiene terpolymer characterized by the at least one of, alternatively two of, alternatively each of properties (a) to (d) and, optionally, (e); an ethylene-propylene-1,4-hexadiene terpolymer characterized by the at least one of, alternatively two of, alternatively each of properties (a) to (d) and, optionally, (e); an ethylene-propylene-1,6-hexadiene terpolymer characterized by the at least one of, alternatively two of, alternatively each of properties (a) to (d) and, optionally, (e); an ethylene-propylene-dicyclopentadiene terpolymer characterized by the at least one of, alternatively two of, alternatively each of properties (a) to (d) and, optionally, (e); an ethylene-propylene-ethylidene norbornene terpolymer characterized by the at least one of, alternatively two of, alternatively each of properties (a) to (d) and, optionally, (e); or an ethylene-propylene-vinyl norbornene terpolymer characterized by the at least one of, alternatively two of, alternatively each of properties (a) to (d) and, optionally, (e); respectively. An example of a suitable EPDM is an ethylene-propylene-diene terpolymer made using a molecular catalyst and having 72.0 wt % ethylenic monomeric content measured according to ASTM D3900B and a melt index (190° C., 2.16 kg) of 1.0 g/10 min.; obtained commercially as VISTALON EPDMs such as VISTALON 722 from ExxonMobil; the diene may be 1,4-hexadiene, VNB, or ENB. Another example is EPDM is an ethylene-propylene-diene terpolymer made using a molecular catalyst; obtained commercially from The Dow Chemical Company as NORDEL IP EPDMs such as NORDEL IP 3722P EL Hydrocarbon Rubber having 71 wt % ethylenic monomeric unit level and less than 1 wt % ENB comonomeric unit level. The ENB wt % may be measured according to ASTM D6047.

In some aspects the comonomer used to make the (A) crosslinkable ethylene/alpha-olefin copolymer or the (D) supplemental polymer may further include an olefin-functional hydrolyzable silane such as the hydrolyzable silane monomer of paragraph [0019] of WO 2016/200600 A1 (PCT/US16/033879 filed May 24, 2016) to Chaudhary; or of U.S. Pat. No. 5,266,627 to Meverden et al. The olefin-functional hydrolyzable silane may be grafted (post-reactor) onto copolymer (A) or onto supplemental polymer (D). Alternatively, the olefin-functional hydrolyzable silane may be copolymerized with ethylene, alpha-olefin, and optionally a second comonomer such as the second alpha-olefin or non-conjugated diene to directly make the (A) crosslinkable ethylene/alpha-olefin copolymer containing hydrolyzable silyl groups. Alternatively, the olefin-functional hydrolyzable silane may be copolymerized with ethylene and an unsaturated carboxylic ester comonomer to directly make the (D) embodiment crosslinkable ethylene/unsaturated carboxylic ester copolymer containing hydrolyzable silyl groups. In some aspects the olefin-functional hydrolyzable silane is vinyltrimethoxysilane (VTMS), vinyltriethoxysilane (VTES), vinyltriacetoxysilane, or gamma-(meth)acryloxy propyl trimethoxy silane and the hydrolyzable silyl groups are 2-trimethoxysilylethyl, 2-triethoxysilylethyl, 2-triacetoxysilylethyl, or 3-trimethoxysilylpropyloxycarbonylethyl or 3-trimethoxysilylpropyloxycarbonylpropyl.

Other embodiments of (A) crosslinkable ethylene/alpha-olefin copolymer, its properties and amounts are described earlier and exemplified in the inventive examples later. The (A) crosslinkable ethylene/alpha-olefin copolymer having at least one of, alternatively two of, alternatively each of properties (a) to (d) and, optionally, (e) are generally known and may be obtained from commercial suppliers (e.g., The Dow Chemical Company) or may be made by copolymerizing ethylene and one or more olefin-functional comonomer to give the copolymer, with or without a catalyst.

Polymerization methods suitable for making (A) crosslinkable ethylene/alpha-olefin copolymer and (D) supplemental polymer are generally well-known. For example, the crosslinkable ethylene/alpha-olefin copolymer may be made by copolymerizing ethylene and one or more olefin-functional comonomers in a reactor at low pressure (e.g., with catalyst) or high pressure (e.g., without catalyst) to give the (A) crosslinkable ethylene/alpha-olefin copolymer. Alternatively, the (A) crosslinkable ethylene/alpha-olefin copolymer may be made by a post-reactor grafting method such as reactive extrusion of a polyethylene with a comonomer such as the olefin-functional hydrolyzable silane, optionally initiated or accelerated with peroxides or catalysts, to make a graft copolymer form of the (A) crosslinkable ethylene/alpha-olefin copolymer. (D) supplemental polymer, especially the ethylenic polymers, may be made in an analogous manner.

The constituent (B): triallyl phosphate or TAP is a compound of formula O=P(OCH$_2$C(H)=CH$_2$)$_3$. It is commercially available. Embodiments of the (B) TAP and its amounts are described earner and exemplified in the inventive examples later.

The constituent (C): organic peroxide. The (C) organic peroxide may be 0.05 to 4.5 wt %, alternatively 0.1 to 3 wt %, alternatively 0.5 to 2.5 wt % of the peroxide-curable ethylene copolymer composition. The (C) organic peroxide may be of formula R$^O$—O—O—R$^O$, wherein each R$^O$ independently is a (C$_1$-C$_{20}$)alkyl group or (C$_6$-C$_{20}$)aryl group. Each (C$_1$-C$_{20}$)alkyl group independently is unsubstituted or substituted with 1 or 2 (C$_6$-C$_{12}$)aryl groups. Each (C$_6$-C$_{20}$)aryl group is unsubstituted or substituted with 1 to 4 (C$_1$-C$_{10}$)alkyl groups. The (C) organic peroxide may be any one of the organic peroxides described earlier, or a combination of any two or more thereof. In some aspects only a single type of (C) organic peroxide is used, e.g., a 20:80 (wt/wt) blend of t-butyl cumyl peroxide and bis(t-butyl peroxy isopropyl)benzene (e.g., LUPEROX D446B, which is commercially available from Arkema), alternatively dicumyl peroxide (e.g., PERKADOX BC-FF from AkzoNobel).

The optional constituent (D) supplemental polymer selected from an ethylene/unsaturated carboxylic ester copolymer, polyethylene homopolymer, Non-(molecular catalyst)-formed ethylene/alpha-olefin copolymer, and propylene-based polymer. A polyethylene homopolymer consists of ethylene monomeric units. A Non-(molecular catalyst)-formed ethylene/alpha-olefin copolymer comprises ethylene monomeric units and olefin comonomeric units. In some aspects the Non-(molecular catalyst)-formed ethylene/alpha-olefin copolymer is made by copolymerizing ethylene and an alpha-olefin with a Ziegler-Natta catalyst or without any catalyst, as in a high pressure polymerization. The polyethylene homopolymer or Non-(molecular catalyst)-formed ethylene/alpha-olefin copolymer may be free of covalently bonded silicon atoms, alternatively the polyethylene homopolymer or Non-(molecular catalyst)-formed ethylene/alpha-olefin copolymer may further contain hydrolyzable silyl functional groups (e.g., trimethoxysilyl groups), which may be made as described herein. A "propylene-based polymer" is a polypropylene homopolymer having only repeat units derived from the monomer propylene (CH$_3$CH$_2$=CH$_2$) or a propylene-based copolymer having monomeric units derived from the monomer propylene (CH$_3$CH$_2$=CH$_2$) and one or more comonomeric units derived from one or more olefin-functional comonomers. The propylene monomeric units comprise on average per molecule, at least 50 weight percent of the macromolecules of the propylene-based copolymer. The comonomeric units are independently derived from one or more olefin-functional comonomers described earlier for ethylene/alpha-olefin copolymers. In some aspects the olefin-functional comonomer(s) used to make the comonomeric units of the propylene-based copolymer is/are (C$_3$-C$_{20}$)alpha-olefin(s), described earlier and incorporated here by reference.

In some aspects (D) supplemental polymer is absent from the peroxide-curable ethylene copolymer composition, and thus from the inventive crosslinked product made therefrom. In some aspects (D) is present in the peroxide-curable ethylene copolymer composition and (D) is the polyethylene homopolymer; alternatively (D) is the Non-(molecular catalyst)-formed ethylene/alpha-olefin copolymer; alternatively (D) is the propylene-based polymer. The ethylene/unsaturated carboxylic ester copolymer may be an ethylene/vinyl carboxylic ester copolymer such as ethylene/vinyl acetate (EVA) copolymer or an ethylene/alkyl (meth)acrylate (EAA) copolymer such as ethylene/ethyl acrylate (EEA) copolymer. In some aspects (D) is present and is a polypropylene homopolymer. In some aspects (D) is present and is a polypropylene copolymer, which typically contains at least 60 wt %, alternatively at least 70 wt %, alternatively at least 80 wt % of propylene monomeric units; at least 1 wt % comonomeric units; and at most 40 wt %, alternatively at most 30 wt %, alternatively at most 20 wt % comonomeric units, respectively. Other embodiments of (D), its properties and amounts are described earner and exemplified in an inventive example later.

Examples of polyethylene homopolymers useful as (D) are low density polyethylene (LDPE), density 0.910 to 0.940 g/cm$^3$, and high density polyethylene, density up to 0.965 g/cm$^3$. Ethylene-based copolymers not made with molecular catalysts that are useful as (D) are made by copolymerizing ethylene and olefin-functional comonomers with a non-(molecular catalyst) or without a catalyst. Alternatively, (D) may have a melt index (190° C., 2.16 kg) of from 2 to 60 g/10 min., alternatively 5 to 40 g/10 min. measured according to ASTM D1238-04.

Optional constituents (E) to (O). Optionally, the peroxide-curable ethylene copolymer composition, and/or the crosslinked ethylene/alpha-olefin copolymer made therefrom by curing same, may contain zero, one, or more additives and/or zero, one or more liquid aromatic or saturated hydrocarbons (LASH). Any constituent (G) to (O), when present, may be independently from >0.00 to 2.00 wt %, alternatively 0.01 to 1.00 wt % of the peroxide-curable ethylene copolymer composition.

The optional constituent (E) antioxidant. The (E) antioxidant functions to provide antioxidizing properties to the peroxide-curable ethylene copolymer composition and/or peroxide-cured semiconducting product. Examples of suitable (E) are bis(4-(1-methyl-1-phenylethyl)phenyl)amine (e.g., NAUGARD 445); 2,2'-methylene-bis(4-methyl-6-t-butylphenol) (e.g., VANOX MBPC); 2,2'-thiobis(2-t-butyl-5-methylphenol (CAS No. 90-66-4, commercially LOWINOX TBM-6); 2,2'-thiobis(6-t-butyl-4-methylphenol (CAS No. 90-66-4, commercially LOWINOX TBP-6); tris[(4-tert-butyl-3-hydroxy-2,6-dimethylphenyl)methyl]-1,3,5-triazine-2,4,6-trione (e.g., CYANOX 1790); pentaerythritol tetrakis(3-(3,5-bis(1,1-dimethylethyl)-4-hydroxyphenyl) propionate (e.g., IRGANOX 1010, CAS Number 6683-19-8); 3,5-bis(1,1-dimethylethyl)-4-hydroxybenzenepropanoic acid 2,2'-thiodiethanediyl ester (e.g., IRGANOX 1035, CAS Number 41484-35-9); and distearyl thiodipropionate ("DSTDP"). In some aspects (E) is bis(4-(1-methyl-1-phenylethyl)phenyl)amine (e.g., NAUGARD 445, which is commercially available from Addivant, Danbury, Conn., U.S.A.). (E) may be 0.01 to 1.5 wt %, alternatively 0.05 to 1.2 wt %, alternatively 0.1 to 1.0 wt % of the peroxide-curable ethylene copolymer composition.

The optional constituent (F) coagent that is not TAP. The (F) may be a compound having on average per molecule one or more —$CH_2$=$CH_2$ groups. Examples of (F) are described above. In some aspects (F) is the unsaturated organophosphorous compound. In some aspects (F) is alpha-methyl styrene dimer (AMSD) or a diisopropenylbenzene (DIPB) or triallyl isocyanurate (TAIC). AMSD may be, e.g., Nofmer MSD from NOF Corporation and is also known as 2,4-diphenyl-4-methyl-1-pentene (CAS 6362-80-7). The DIPB may be 1,3-diisopropenylbenzine (1,3-DIPB, CAS 3748-13-8, Sigma-Aldrich). When present, (F) may be in a concentration of from 0.05 to 1.0 wt %, alternatively 0.10 to 0.90 wt %, alternatively 0.10 to 0.60 wt % of the peroxide-curable ethylene copolymer composition.

The optional constituent (H) hindered amine stabilizer. The (H) is a compound that has a sterically hindered amino functional group and inhibits oxidative degradation and can also reduce acid-catalyzed degradation, if any, of (C) organic peroxide. Examples of suitable (H) are butanedioic acid dimethyl ester, polymer with 4-hydroxy-2,2,6,6-tetramethyl-1-piperidine-ethanol (CAS No. 65447-77-0, commercially LOWILITE 62).

The optional constituent (I) flame retardant. (I) decreases flammability of the crosslinked ethylene/alpha-olefin copolymer. Examples are organohalogen compounds, including brominated flame retardants, inorganic synergist compounds such as antimony trioxide, organophosphorous compounds, inorganic phosphorous compounds, metal hydrates, metal carbonates, and mixtures of any two or more thereof.

The optional constituent (J) water tree retardant or electrical tree retardant. The water tree retardant is a compound that inhibits water treeing, which is a process by which polyolefins degrade when exposed to the combined effects of an electric field and humidity or moisture. The electrical tree retardant is a compound that inhibits electrical treeing, which is an electrical pre-breakdown process in solid electrical insulation due to partial electrical discharges. Electrical treeing can occur in the absence of water. Water treeing and electrical treeing are problems for electrical cables that contain a coated conductor wherein the coating contains a polyolefin. The (J) may be a poly(ethylene glycol) (PEG).

The optional constituent (K) colorant. E.g., a pigment or dye. E.g., titanium dioxide.

Constituent (N) scorch retardant. Examples of a scorch retardant are allyl-containing compounds described in U.S. 62/779,2561, column 2, line 62, to column 3, line 46.

Constituent (O) filler. The (O) filler may be a calcined clay, an organoclays, carbon black, titanium oxide, or a hydrophobized fumed silica such as CAB-O-SIL hydrophobized fumed silicas from Cabot Corporation. The (O) filler may have flame retarding effects.

Other embodiments of constituents (E) to (O), their properties and amounts are described earlier and, for constituents (E), (F), (H), and (J), exemplified in inventive examples later. Constituents (E) and (H) to (K), and (N) are additives that may be used to impart to either to the composition and/or to the product, one or more beneficial properties other than to crosslink density. The (G) PDMS fluid is an additive that may be sprayed on pellets of the peroxide-curable ethylene copolymer composition to enhance extrusion thereof. The (L) LASH(s) is an additive that may be used to make, purge, or carry the peroxide-curable polymer composition or crosslinked ethylene/alpha-olefin copolymer. Constituents (E) to (O) are distinct compounds/materials from constituents (A) to (D) and from each other. Additives typically are not removed from the crosslinked ethylene/alpha-olefin copolymer. (G) PDMS fluid and (L) LASH are chemically inert and may be volatile and removable.

In addition the peroxide-curable ethylene copolymer composition may further comprise 0.005 to 0.5 wt % each of one or more optional additives selected from a carrier resin, a corrosion inhibitor (e.g., $SnSO_4$), lubricant, processing aid, anti-blocking agent, anti-static agent, nucleating agent, slip agent, plasticizer, tackifier, surfactant, extender oil, acid scavenger, voltage stabilizer, antioxidant, and metal deactivator.

To facilitate mixing of the constituent (A) crosslinkable ethylene/alpha-olefin copolymer with the constituents (B) and (C) and any optional constituents (D) to (O), one or more of the constituents (B) and (D) and any constituents (D) to (O) may be provided in the form of an additive masterbatch. The additive masterbatch may contain a dispersion of (B) and (C) and optionally one or more of (D) to (O) in a carrier resin. The carrier resin may be an EVA copolymer, an EAA copolymer, or a poly(1-butene-co-ethylene) copolymer. The amount of carrier resin incorporated into the peroxide-curable ethylene copolymer composition may be from 0 to <10 wt %, alternatively 0 wt %, alternatively from >0 to 5 wt %. In the additive masterbatch, the carrier resin may be from ≥90 wt % to <100 wt % and the (B) and (C) and any optional one or more constituents (D) to (O) together may be from >0 wt % to ≤10 wt % of the total weight of the additive masterbatch. In some aspects from 1 to 20 weight parts of the additive masterbatch may be mixed or blended with from 99 to 80 weight parts of granules of the (A) crosslinkable ethylene/alpha-olefin copolymer to give a preparative mixture or blend thereof, which may then be pelletized according to the methods described here to give pellets. The pellets may then contacted with a suitable amount of the (C) organic peroxide to give the peroxide-curable ethylene copolymer composition. Alternatively, (C) organic peroxide may be included in the additive masterbatch and temperature of the additive masterbatch during its preparation and mixing with (A) may be kept well below a 10-hour half-life temperature of the (C).

The crosslinked ethylene/alpha-olefin copolymer. The crosslinked ethylene/alpha-olefin copolymer contains networked polyolefinic resins that contain C—C bond crosslinks formed during curing of the peroxide-curable ethylene copolymer composition. The networked polyolefinic resins comprise products of coupling the (A) crosslinkable ethylene/alpha-olefin copolymers or, when present, (D) supplemental polymer. Other approaches for crosslinking of the ethylene/alpha-olefin copolymer or, when present, (D) may also be utilized, including radiation crosslinking and, in embodiments wherein (A) and/or (D) contains hydrolyzable silyl groups as discussed earlier, moisture-induced crosslinking. The crosslinked ethylene/alpha-olefin copolymer may also contain by-products of curing such as alcohol products of the reaction of the (C) organic peroxide. When the peroxide-curable ethylene copolymer composition further contains one or more of any optional constituents (D) to (O), the crosslinked ethylene/alpha-olefin copolymer may also contain the any one or more of the optional constituents (D) to (O), or one or more reaction products formed therefrom during the curing of the peroxide-curable ethylene copolymer composition. Any (L) LASH(s) and any other volatile compounds (e.g., unreacted comonomers) may be removed from the crosslinked ethylene/alpha-olefin copolymer to give a crosslinked ethylene/alpha-olefin copolymer that is independently free of, or contains from >0 to <1 wt % of each of LASH and any other volatile compounds. Such removal may be performed by any suitable means such as decantation, devolatilization, distillation, evaporation, filtration, sparging with inert gas (e.g., anhydrous $N_2$ gas), and stripping. The crosslinked ethylene/alpha-olefin copolymer may be in a divided solid form or in continuous form. The divided solid form may comprise granules, pellets, powder, or a combination of any two or more thereof. The continuous form may be a molded part (e.g., blow molded part) or an extruded part (e.g., a coated conductor or a cable).

The coated conductor. The coated conductor may be an insulated electrical/optical conductor, which may be an insulated electrical conductor, insulated optical conductor, or insulated electro-optical conductor. The insulated optical conductor may include coated optical fibers and/or optical fiber (fiber optic) cables for use in data-transmitting applications. The insulated electrical conductor may include coated metal wires and/or electrical cables, including power cables, for use in low, medium, high and extra-high voltage electricity-transmitting applications. The insulated electro-optical conductor may include a coated combination of optical fibers and metal wires for using in both data-transmitting and electricity-transmitting applications. A "wire" means a single strand or filament of conductive material, e.g., conductive metal such as copper or aluminum, or a single strand or filament of optical fiber. A "cable" and "power cable" are synonymous and mean an insulated conductor comprising at least one wire or optical fiber, or a combination thereof, disposed within a covering that may be referred to as a sheath, jacket (protective outer jacket), or coating. When the insulated conductor contains a wire, it may be called an insulated electrical conductor; when it contains an optical fiber, it may be called an insulated optical conductor. The insulated electrical conductor may be designed and constructed for use in medium, high, or extra-high voltage applications. Examples of suitable cable designs are shown in U.S. Pat. Nos. 5,246,783; 6,496,629; and 6,714,707.

The insulated electrical/optical conductor may contain a conductor core and an outer single layer covering or an outer multilayer covering disposed therearound so as to protect and insulate the conductor core from external environments. The conductor core may be composed of one or more metal wires, one or more optical fibers, or a combination thereof. When the conductor core contains two or more metal wires and/or optical fibers, the metal wires may be sub-divided into discrete wire bundles and the optical fibers may be sub-divided into discrete fiber bundles. Each wire or optical fiber in the conductor core, whether bundled or not, may be individually coated with an insulation layer and/or the discrete bundles may be coated with an insulation layer. The single layer covering or multilayer covering (e.g., single layer or multilayer coating or sheath) primarily functions to protect or insulate the conductor core from external environments such as sunlight, water, heat, oxygen, other conductive materials (e.g., to prevent short-circuiting), and/or corrosive materials.

The single layer or multilayer covering from one insulated electrical/optical conductor to the next may be configured differently depending upon their respective intended uses. For example, viewed in cross-section, the multilayer covering of the insulated electrical conductor may be configured sequentially from its innermost layer to its outermost layer with the following components: an inner semiconducting layer, a crosslinked polyolefin insulation layer comprising the crosslinked ethylene/alpha-olefin copolymer (inventive crosslinked product), an outer semiconducting layer, a metal shield, and a protective sheath. The layers and sheath are circumferentially and coaxially (longitudinally) continuous. The metal shield (ground) is coaxially continuous, and circumferentially either continuous (a layer) or discontinuous (tape or wire). Depending on the intended application the multilayer covering for the insulated optical conductor may omit the semiconducting layers and/or the metal shield, but may include a light-blocking material to prevent crosstalk between optical fibers and/or a stiffening material such as polymer fibers or bundles thereof to prevent overbending leading to breaking of the optical fibers. The outer semiconducting layer, when present, may be composed of a peroxide-crosslinked semiconducting product that is strippable from the crosslinked polyolefin layer.

The method of conducting electricity. The inventive method of conducting electricity may use the inventive coated conductor that comprises the insulated electrical conductor embodiment or the insulated electro-optical conductor embodiment.

Advantageously we discovered that the crosslinked ethylene/alpha-olefin copolymer product (inventive crosslinked product) exhibits sufficient and enhanced flexibility, sufficient and enhanced heat or oxidative stability, and sufficient and enhanced dissipation factor for use as the crosslinked polyolefin insulation layer of the single layer covering or the multilayer covering of the insulated electrical/optical conductor. The peroxide-curable ethylene copolymer composition (inventive composition) is useful for making the inventive crosslinked product. After the inventive composition is cured the resulting inventive crosslinked product may be characterized by an enhanced (i.e., increased) TER (7 d or 28 d, 136° C.), an enhanced (i.e., increased) OIT ($O_2$, 185° C.), and/or an enhanced (i.e., decreased) DF (130° C., 60 Hz, 2 kV), all relative to a TAP-free comparative composition and TAP-free comparative crosslinked product made therefrom. In some aspects the crosslinked ethylene/alpha-olefin copolymer product is further defined by any one of limitations (i) to (iv): (i) characterized by TER (7 d or 28 d, 136° C.) of at least 20%, alternatively at least 40%, alternatively at least 50%, alternatively at least 60%, alternatively at least 65%; and at most 200%, alternatively at most 150%, alternatively at most 120%, alternatively at most 110%, alternatively at most 100%; (ii) characterized by OIT ($O_2$, 185° C.) of at least 6 minutes, alternatively at least 10 minutes, alternatively at least 20 minutes, alternatively at least 30 minutes; and at most 60 minutes, alternatively at most 50 minutes, alternatively at most 45 minutes; (iii) characterized by DF (130° C., 60 Hz, 2 kV) of 0.05% to 1.10%, alternatively at most 1.001%, alternatively at most 0.50%, alternatively at most 0.30 wt %; and at least 0.01%, alternatively at least 0.05%, alternatively at least 0.10%; and (iv) each of (i), (ii) and (iii). In some aspects the inventive composition is characterized by the inventive crosslinked product made therefrom, and the inventive crosslinked product is characterized by any one of the foregoing limitations (i) to (iv). In contrast a non-inventive comparative crosslinked product made from a non-inventive comparative peroxide-curable ethylene composition that is compositionally identical to the inventive composition except that the comparative composition is free of (does not contain) triallyl phosphate may be characterized by TER (7 d or 28 d, 136° C.) less than 50%, alternatively less than 40%, alternatively less than 30%, alternatively less than 20%; and/or by OIT ($O_2$, 185° C.) of at most 10 minutes, alternatively at most 5 minutes. The inventive insulated electrical/optical conductor is useful for data-transmitting applications and/or for electricity-transmitting applications, including low, medium, high, and ultra-high voltage applications.

The inventive composition (e.g., of aspects 1 to 7) and product (e.g., of aspect 9 to 11) are useful in a variety of applications including as a component of a coating of the coated conductor (e.g., the insulated electrical conductor) such as a coated wire or coated cable for use in the electrical or telecommunications industry, including medium voltage, high voltage, and extra-high voltage electrical cables. E.g., medium voltage electrical cables.

Test samples of embodiments of unfilled and filled compositions may be separately made into compression molded plaques. The mechanical properties of these compositions may be characterized using test samples cut from the compression molded plaques.

Olefin polymerization catalysts include Ziegler-Natta catalysts, Chrome catalysts, and molecular catalysts. Ziegler-Natta (Z-N) such as $TiCl_4/MgCl_2$ and Chrome catalysts such as a chromium oxide/silica gel are heterogeneous in that their catalytic sites are not derived from a single molecular species. Heterogeneous catalysts produce polyolefins with broad molecular weight distributions (MWD) and broad chemical composition distributions (CCD). A molecular catalyst is homogeneous in that it theoretically has a single catalytic site that is derived from a ligand-metal complex molecule with defined ligands and structure. As a result, molecular catalysts produce polyolefins with narrow CCD and narrow MWD, approaching but in practice not reaching the theoretical limit of Mw/Mn=2. Metallocenes are molecular catalysts that contain unsubstituted cyclopentadienyl ligands (Cp). Post-metallocene are derivatives of metallocenes that contain one or more substituted CP ligands, such as constrained geometry catalysts, or are non-sandwich complexes. Examples of post-metallocene catalysts are bis-phenylphenoxy catalysts, constrained geometry catalysts, imino-amido type catalysts, pyridylamide catalysts, imino-enamido catalysts, aminotroponiminato catalysts, amidoquinoline catalysts, bis(phenoxyimine) catalysts, and phosphinimide catalysts.

Composition Preparation Methods. Melt blend constituents of the peroxide-curable ethylene copolymer composition (of comparative or inventive examples) either in a Banbury compounder using a typical compounding temperature of 150° C., rotor speed of 60 to 65 rotations per minute (rpm) or in a ZKS twin-screw extruder using an extrusion temperature of 160° C. or higher (e.g., 200° C.) and a screw speed of e.g., 200 rpm. For laboratory scale procedures, use batch mixers and single screw extruders for melt blending and pelletizing. Soak peroxide and any other liquid additives into the pellets containing blended additives at 50° to 80° C. for 6 to 24 hours. Preparation Method 1 below is an example of a laboratory scale procedure.

Compression Molded Plaque Preparation Method: a crosslinked product may be prepared in the form of a compression molded plaque by compression molding plaques of different thicknesses depending on testing protocol (e.g., a 50 mil (1.3 mm) thick plaque for dissipation factor testing) of a peroxide-curable ethylene copolymer composition at the following conditions: 500 psi (3.4 MPa) at 125° C. for 3 minutes, followed by 2500 psi (17 MPa) at 180° C. for 20 minutes, then cool to 30° C. at 2500 psi pressure, thereby giving a compression molded plaque form of the crosslinked product.

Density Test Method: measured according to ASTM D792-13, *Standard Test Methods for Density and Specific Gravity (Relative Density) of Plastics by Displacement*, Method B (for testing solid plastics in liquids other than water, e.g., in liquid 2-propanol). Report results in units of grams per cubic centimeter ($g/cm^3$).

Dissipation Factor Test Method 1 for DF (130° C., 60 Hz, 2 kV): measured according to ASTM D150-11, *Standard Test Methods for AC Loss Characteristics and Permittivity (Dielectric Constant) of Solid Electrical Insulation*, except for the differences described here. Conducted on crosslinked circular specimens cut from 50 mil (1.3 mm) thick plaques. The plaques were degassed in a vacuum oven at 60° C. for five days. Used a GUILDLINE High Voltage Capacitance Bridge unit, Model 9920A, with a TETTEX specimen holder and a TETTEX AG Instruments Temperature Control Unit. Samples were tested at 60 Hz and 2 kV applied stress at 130° C. (alternative temperatures 25°, 40°, or 90° C.) Same method may be used for measuring dielectric constant.

Dissipation Factor Test Method 2 for DF (100° C., 50 Hz, 2 kV): measured by QS87 bridge with 10 kV power source and electrode system immersed in silicon oil in an oven by: (1) Degas crosslinked plaque at 70° C. for 1 day. (2) Put the degassed plaque into the electrodes once the temperature of electrode increase to around 100° C. (3) At 100° C. Increase voltage to 2 kV (first), then 4 kV and back to 2 kV (second). (4) measure the DF at each stress level and record the DF at 4 kv and second 2 kV and corresponding electrode temperature.

Flexural Modulus (2% secant) Test Method: measured at 23° C. according to ASTM D790-15e2, *Standard Test Methods for Flexural Properties of Unreinforced and Reinforced Plastics and Electrical Insulating Materials*., measured at 2% strain and 0.05 inch/minute (0.127 cm/minute) on compression molded specimens of 125 mil (3.18 mm) thickness with a crosshead position, and expressed in pounds per square inch (psi) or the equivalent megapascals (MPa).

Glass transition temperature ($T_g$) and Melting Point Test Method: measured by differential scanning calorimetry (DSC) according to ASTM 3418-15, *Standard Test Method for Transition Temperatures and Enthalpies of Fusion and Crystallization of Polymers by Differential Scanning calorimetry*, and expressed in degrees Celsius (° C.).

Melt index, $I_2$, Test Method: for ethylene-based (co)polymer is measured according to ASTM D1238-04, *Standard Test Method for Melt Flow Rates of Thermoplastics by Extrusion Platometer*, using conditions of 190° C./2.16 kilograms (kg), formerly known as "Condition E" and also known as $I_2$. Report results in units of grams eluted per 10 minutes (g/10 min.) or the equivalent in decigrams per 1.0 minute (dg/1 min.). 10.0 dg=1.00 g. Melt index is inversely proportional to the weight average molecular weight of the polyethylene, although the inverse proportionality is not linear. Thus, the higher the molecular weight, the lower the melt index.

Oxidative Induction Time Test Method for OIT ($O_2$, 185° C.): Measures the time required to initiate oxidation of a test sample of a crosslinked polyolefin composition, made by the Compression Molded Plaque Preparation Method, under molecular oxygen atmosphere at 185° C. in a differential scanning calorimeter (DSC). Used TA Instruments Thermal Analysis Q-1000 DSC unit equipped with a Module DSC Standard Cell. Cut approximately 2 mg of test sample into thin slices using a razor blade. Placed sliced test sample into an open aluminum DSC pan. Equilibrated pan/contents at 60° C. for 5 minutes under nitrogen gas flowing at 50 milliliters per minute (mL/min.). Then under nitrogen gas raised the temperature at 20° C./min. to 185° C., and held at 185° C. for 5 minutes under nitrogen. Then switched the gas over to molecular oxygen, also at a flow rate of 50 mL/min., and recorded the elapsed time in minutes from when the oxygen gas was switched on (Time 0) to the onset of a significant exothermic peak in DSC as the oxidative induction time or OIT ($O_2$, 185° C.). The longer the elapsed time to OIT ($O_2$, 185° C.), the more resistant to oxidative heat aging the test sample.

Tensile Elongation Retained Test Method for TER (7 d or 28 d, 136° C.): Measured tensile elongation (strain at break) of crosslinked but unaged samples as well as crosslinked and heat-aged (oven) samples according to ASTM D638 and UL 1581/2556. The method used a displacement rate of 20 inches (51 cm) per minute and a Type IV dog bone-shaped specimen having a nominal thickness of 70 mils (1.8 mm). Measurements were repeated four or five times at each condition and averaged, Tensile properties are measured on unaged crosslinked specimens (i.e., kept at room temperature of 23° C. after compression molding) and on heat-aged crosslinked specimens that were aged for 7 days or 28 days at 136° C. Heat-aging is conducted using a Type II ASTM D5423-93 Testing Mechanical Convection Oven. The tensile elongation retained (TER) of heat-aged specimens (7 d or 28 d, 136° C.) is expressed as a percentage of the tensile elongation values of corresponding unaged specimens.

Examples

Constituent (A1): ethylene-1-octene copolymer characterized by a density of 0.872 g/cm$^3$ measured according to ASTM D792; a melt index (190° C., 2.16 kg) of 4.8 g/10 min. measured according to ASTM D1238; a flexural modulus (2% secant) of 1570 psi (10.8 MPa) measured according to ASTM D790-15e2; and a glass transition temperature ($T_g$) of −53° C. measured by differential scanning calorimetry (DSC) according to ASTM 3418-15. Obtained commercially as Developmental XUS 38660.00 Polyolefin Elastomer by The Dow Chemical Company, Midland, Mich., USA.

Constituent (A2): an ethylene/propylene/ENB terpolymer having a density of 0.88 g/cm$^3$ measured according to ASTM D792; an ethylene content of 70 wt % measured according to ASTM D3900-17 (*Standard Test Methods for Rubber-Determination of Ethylene Units in Ethylene-Propylene Copolymers (EPM) and in Ethylene-Propylene-Diene Terpolymers (EPDM) by Infrared Spectroscopy*); an ENB (5-ethylidene-2-norbornene) content of 4.9 wt % measured according to ASTM D6047-17 (*Standard Test Methods for Rubber, Raw—Determination of 5-Ethylidenenorbornene (ENB) or Dicyclopentadiene (DCPD) in Ethylene-Propylene-Diene (EPDM) Terpolymers*); and a Mooney Viscosity (ML 1+4 at 125° C.) of 25 measured according to ASTM D1646-15 (*Standard Test Methods for Rubber—Viscosity, Stress Relaxation, and Pre-Vulcanization Characteristics (Mooney Viscometer)*). Available as NORDEL IP 4725 from The Dow Chemical Company.

Constituent (B1): triallyl phosphate (TAP), >96% purity, obtained commercially from TCI America, Portland, Oreg., USA.

Constituent (C1): dicumyl peroxide obtained commercially as PERKADOX BC-FF from AkzoNobel.

Constituent (C2): 2,5-dimethyl-2,5-di(t-butylperoxy) hexane, available as LUPEROX® 101 from Arkema.

Constituent (D1): a polypropylene homopolymer characterized by a melt flow (230° C., 2.16 kg) of 1.8 g/10 min. measured according to ASTM D1238 and a flexural modulus (0.05 inch/minute, 1% secant) of 190,000 psi (1,310 MPa) measured according to ASTM D790A. Obtained commercially as Braskem FF018F from Braskem.

Constituent (E1): 2,2'-thiobis(2-t-butyl-5-methylphenol (CAS No. 90-66-4). Obtained commercially as LOWINOX TBM-6 from Addivant.

Constituent (F1): 2,4-diphenyl-4-methyl-1-pentene (AMSD). Obtained commercially as Nofmer MSD from NOF Corporation, White Plains, N.Y., USA.

Constituent (F2): triallyl isocyanurate, obtained commercially from Sigma-Aldrich.

Constituent (H1): 1,3,5-triazine-2,4,6-triamine, N2,N2"-1,2-ethanediylbis[N2-[3-[[4,6-bis[butyl(1,2,2,6,6-pentamethyl-4-piperidinyl)amino]-1,3,5-triazin-2-yl]amino]propyl]-N',N"-dibutyl-N',N"-bis(1,2,2,6,6-pentamethyl-4-piperidinyl)-. Obtained commercially as SABOSTAB UV 119 from SABO S.p.A., Italy.

Constituent (J1): PEG 20000, a poly(ethylene glycol) having a mean $M_n$ 20000 g/mol and obtained commercially from Clariant, Charlotte, N.C., USA.

Comparative Examples 1 and 2 (CE1 and CE2): see Preparation Method 1.

Comparative Examples 3 and 4 (CE3 and CE4): see Preparation Method 2.

Inventive Examples 1 to 6 (IE1 to IE6): see Preparation Method 1.

Inventive Example 7 (IE7): see Preparation Method 2.

Preparation Method 1: Melted (C1) at 60° C., and into the resulting melt mixed (F1) at a 5:1 wt/wt ratio (C1)/(F1) to give a melt mixture. Separately mixed (A1), (D1) if any, (E1), (H1), and (J1) by hand in a container to give a solids mixture. Compound the solids mixture in a 420 cm$^3$ volume Brabender batch mixer with cam rotors at 190° C. and 40 rotations per minute (rpm) for 5 minutes (after loading) to give a blend. Removed the blend from the mixer, cold pressed the blend into a thin sheet, and cut the sheet into strips. Conditioned the strips in a freezer to harden, and then fed the hardened strips through a pelletizer to give pellets. Heated the pellets in a glass jar at 50° C. for 2 hours, and then onto the heated pellets sprayed the (C1)/(F1) melt mixture and, for IE1 to IE6, also sprayed (B1) to give a peroxide-curable ethylene copolymer composition in the jar. ((B1) was not used for CE1 or CE2.) Tumbled the jar to blend its contents for 10 minutes at room temperature, and then placed the jar and its contents into an oven at 50° C. for 16 hours. The resulting contents were mixed in a 420 cm$^3$ volume Brabender mixing bowl with cam rotors at 120° C. and 30 rpm for 10 minutes (after loading) to give the peroxide-curable ethylene copolymer compositions of IE1 to IE6 and CE1 and CE2, as the case may be. Removed samples from the bowl, cold pressed or compression molded the removed samples, and characterized the cold pressed or compression molded samples. The compositions and characterized properties of the peroxide-curable ethylene copolymer compositions of IE1 to IE6 and CE1 and CE2 are shown later in Tables 1 and 2.

Cold pressed samples of the compositions were compression molded under conditions that prevented significant crosslinking, and tested for melt rheological characteristics. Conditions that prevented significant crosslinking were pressing at 500 psi (3.5 MPa) at 120° C. for 3 minutes, followed by 2500 psi (17 MPa) at 120° C. for 3 minutes, then cooling to 30° C. under the latter pressure, and opening the press and removing the resulting compression molded plaques. Still other samples of the compositions were compression molded under complete crosslinking conditions to make specimens of different dimensions (see Compression Molded Plaque Preparation Method above), and the specimens were tested for electrical and mechanical properties. The data are shown below in Tables 1 and 2.

Preparation Method 2: to a bottle containing constituent (A2) was added constituent (B1), if any, and constituent (C2). The contents in the bottle were rolled at 75 rotations per minutes (rpm) at 23° C. for overnight to give a final polymer blend. See Table 3.

Compression mold polymer blend of Preparation Method 2 under conditions that prevent significant crosslinking, and test for melt rheological characteristics. Conditions that prevented significant crosslinking are pressing at 10 MPa at 120° C. for 2 minutes, followed by 10 MPa at 180° C. for 15 minutes, then cooling under 10 Mpa pressure to 30° C., opening the press, and removing the resulting compression molded plaques. Test specimens for electrical properties. The data are shown below in Table 3.

TABLE 1

Compositions and Results for (D) PP-with Examples. ("0" means 0.00)

| Constituent (wt %) | CE1 | IE1 | IE2 |
|---|---|---|---|
| (A1) | 87.80 | 86.30 | 83.30 |
| (B1) | 0 | 1.50 | 4.50 |
| (C1) | 2.00 | 2.00 | 2.00 |
| (D1) | 8.68 | 8.68 | 8.68 |
| (E1) | 0.34 | 0.34 | 0.34 |
| (F1) | 0.40 | 0.40 | 0.40 |
| (H1) | 0.20 | 0.20 | 0.20 |
| (J1) | 0.58 | 0.58 | 0.58 |
| Example Total* | 100.00 | 100.00 | 100.00 |
| OIT ($O_2$, 185° C.) (min.) (1) | 2.7 | 20.8 | 25.6 |
| TER (7 d, 136° C.) (%) (2a) | N/M** | N/M | N/M |
| TER (28 d, 136° C.) (%) (2b) | N/M | N/M | N/M |
| Apparent Flexibility after 28 d, 136° C. | N/M | N/M | N/M |
| Method 1 DF (130° C./60 Hz/2 kV) (%) (3) | 0.40 | 0.14 | 0.14 |

TABLE 2

Compositions and Results for (D) PP-free Examples. ("0" means 0.00)

| Constituent (wt %) | CE2 | IE3 | IE4 | IE5 | IE6 |
|---|---|---|---|---|---|
| (A1) | 96.48 | 91.98 | 95.38 | 94.98 | 94.48 |
| (B1) | 0 | 4.50 | 1.10 | 1.50 | 2.00 |
| (C1) | 2.00 | 2.00 | 2.00 | 2.00 | 2.00 |
| (D1) | 0 | 0 | 0 | 0 | 0 |
| (E1) | 0.34 | 0.34 | 0.34 | 0.34 | 0.34 |
| (F1) | 0.40 | 0.40 | 0.40 | 0.40 | 0.40 |
| (H1) | 0.20 | 0.20 | 0.20 | 0.20 | 0.20 |
| (J1) | 0.58 | 0.58 | 0.58 | 0.58 | 0.58 |
| Example Total* | 100.00 | 100.00 | 100.00 | 100.00 | 100.00 |
| OIT ($O_2$, 185° C.) (min.) (1) | 4.9 (3.3)^ | 32.6 | 51.8 | 54.7 | 56.3 |
| TER (7 d, 136° C.) (%) (2a) | 12.9 | N/M** | 95.9 | 97.8 | 109.8 |
| TER (28 d, 136° C.) (%) (2b) | 9.2 | N/M | 98.0 | 102.9 | 115.9 |
| Apparent Flexibility after 28 d, 136° C. (3) | Not flexible, Brittle | N/M | Very flexible | Very flexible | Very flexible |
| Method 1 DF (130° C./60 Hz/2 kV) (%) (4) | 0.57 (0.52)^ | 0.15 | 0.32 | 0.19 | 0.13 |

TABLE 3

Compositions and Results for (D) PP-free Examples. ("0" means 0.00)

| Constituent (wt %) | CE3 | CE4 | IE7 |
|---|---|---|---|
| (A2) | 98.52 | 96.62 | 96.62 |
| (B1) | 0 | 0 | 1.93 |
| (C2) | 1.48 | 1.45 | 1.45 |
| (F2) | 0 | 1.93 | 0 |
| Example Total* | 100.00 | 100.00 | 100.00 |
| OIT ($O_2$, 185° C.) (min.) (1) | N/M** | N/M | N/M |
| TER (3 d, 177° C.) (%) (2c) | N/M | 21.2 | 47.9 |
| TER (7 d, 177° C.) (%) (2d) | N/M | 9.6 | 22.9 |
| Apparent Flexibility after 7 d, 177° C. (3) | N/M | Not flexible, Brittle | Very flexible |
| DF Method 2 (90° C./50 Hz/4 kV) (%) (5a) | 11.66 | 8.57 | 5.23 |
| DF Method 2 (90° C./50 Hz/2 kV) (%) (5b) | 8.87 | 6.61 | 3.63 |

The data in Tables 1 and 2 show the crosslinked ethylene/alpha-olefin copolymer product made from the respective peroxide-curable ethylene copolymer compositions (examples IE1 to IE6) exhibit increased flexibility and oxidative stability sufficient for use as the crosslinked polyolefin insulation layer of the multilayer covering of the insulated electrical/optical conductor. The examples IE4 to IE6 are characterized by enhanced (i.e., increased) TER (7 d or 28 d, 136° C.), enhanced (i.e., increased) OIT ($O_2$, 185° C.), and enhanced (i.e., decreased) DF (130° C., 60 Hz, 2 kV), all relative to the respective TAP-free comparative examples CE1 and CE2. The examples IE1 to IE3 are characterized by enhanced (i.e., increased) OIT ($O_2$, 185° C.), and enhanced (i.e., decreased) DF (130° C., 60 Hz, 2 kV), and are expected to have enhanced (i.e., increased) TER (7 d or 28 d, 136° C.), all relative to the respective TAP-free comparative examples CE1 and CE2. Compare IE1, IE2 and IE3 to CE1 and compare IE4 to IE6 to CE2, for comparing compositions made and tested as part of the same study. Compositions CE1 and CE2 were compositionally identical to compositions IE1 and IE2 or IE3 to IE6, respectively, except compositions CE1 and CE2 lack triallyl phosphate, whereas compositions IE1 to IE6 contained triallyl phosphate.

Comparing CE3 and IE7 in Table 3, triallyl phosphate enhanced (i.e., decreased) DF (90° C., 50 Hz, 4 kV or 90° C./50 Hz/2 kV.) in crosslinked ethylene/alpha-olefin/diene terpolymer, and did so with a different organic peroxide.

The invention claimed is:

1. A peroxide-curable ethylene copolymer composition comprising 54.00 to 99.00 weight percent (wt %) of (A) a crosslinkable ethylene/alpha-olefin copolymer, which is made by a process comprising copolymerizing ethylene and an alpha-olefin comonomer in the presence of a molecular catalyst used for copolymerizing ethylene and the alpha-olefin comonomer, and which (A) crosslinkable ethylene/ alpha-olefin copolymer has a density from 0.850 to 0.890 grams per cubic centimeter (g/cm$^3$) measured according to ASTM D792 and is optionally characterized by at least one of properties (a) to (c): (a) a flexural modulus (2% secant) of from >0 to 6,500 psi (>0 to 45 MPa) measured according to ASTM D790-15e2, (b) a glass transition temperature ($T_g$) of −130° to −20° C. measured by differential scanning calorimetry (DSC) according to ASTM 3418-15, and (c) a melt index (190° C., 2.16 kilograms (kg), "$I_2$") of 0.5 decigram per minute (dg/min.) to 50 dg/min. measured according to ASTM D1238-04; from 0.950 to 5.00 wt % of (B) triallyl phosphate (TAP); from 0.050 to 5.00 wt % of (C) an organic peroxide; and from 0.00 to 40 wt % of (D) a supplemental polymer selected from an ethylene/unsaturated carboxylic ester copolymer, a polyethylene homopolymer, a non-(molecular catalyst)-formed ethylene/alpha-olefin copolymer, and a propylene-based polymer; with the proviso that the total weight of constituents (A) and (D) is 80.00 to 99.00 wt %; wherein all wt % are based on total weight of the peroxide-curable ethylene copolymer composition and total weight of the peroxide-curable ethylene copolymer composition is 100.0 wt %; wherein the alpha-olefin comonomer is a ($C_3$-$C_{20}$)alpha-olefin and the (A) crosslinkable ethylene/alpha-olefin copolymer is an ethylene($C_3$-$C_{20}$)alpha-olefin bipolymer; wherein the peroxide-curable ethylene copolymer composition further comprises:

from 0.20 to 0.50 wt % constituent (E) wherein (E) is 2,2'-thiobis(2-t-butyl-5-methylphenol, from 0.30 to 0.50 wt % constituent (F) wherein (F) is alpha-methyl styrene dimer (AMSD), from 0.10 to 0.30 wt % constituent (H) wherein (H) is 1,3,5-triazine-2,4,6-triamine, N2,N2"-1,2-ethanediyl-bis[N2-[3-[[4,6-bis[butyl(1,2,2,6,6-pentamethyl-4-piperidinyl)amino]-1,3,5-triazin-2-yl]amino]propyl]-N', N"-dibutyl-N',N"-bis(1,2,2,6,6-pentamethyl-4-piperidinyl)-, and from 0.40 to 0.80 wt % constituent (J) wherein (J) is a poly(ethylene glycol) having a $M_n$ of 15000 to 25000 g/mol.

2. The composition of claim 1 further described by any one of limitations (i) to (iv): (i) the (A) crosslinkable ethylene/alpha-olefin copolymer is from 90 to 99 wt % of the peroxide-curable ethylene copolymer composition, and the peroxide-curable ethylene copolymer composition is free of (lacks) the (D) supplemental polymer; (ii) the (A) crosslinkable ethylene/alpha-olefin copolymer is from 58.00 to 90.00 wt % and the (D) supplemental polymer is from 40.0 to 1.0 wt % of the peroxide-curable ethylene copolymer composition; (iii) the (D) supplemental polymer is a polypropylene homopolymer; and (iv) both (ii) and (iii).

3. The composition of claim 1 further described by any one of limitations (i) to (iv): (i) the (B) triallyl phosphate (TAP) is from 1.01 to 4.54 wt %; (ii) the (B) triallyl phosphate (TAP) is from 1.05 to 4.00 wt %; (iii) the (B) triallyl phosphate (TAP) is from 1.10 to 3.00 wt %; (iv) the (B) triallyl phosphate (TAP) is from 1.50 to 4.600 wt %; wherein all wt % are based on total weight of the peroxide-curable ethylene copolymer composition.

4. The composition of claim 1 further described by any one of limitations (i) to (v): (i) the (C) organic peroxide is from 1.0 to 4.0 wt % based on total weight of the peroxide-curable ethylene copolymer composition; (ii) the (C) organic peroxide is a compound of formula $R^O$—O—O—$R^O$, wherein each $R^O$ independently is a ($C_1$-$C_{20}$)alkyl group or ($C_6$-$C_{20}$)aryl group; (iii) the (C) organic peroxide is bis(1,1-dimethylethyl) peroxide; bis(1,1-dimethylpropyl) peroxide; 2,5-dimethyl-2,5-bis(1,1-dimethylethylperoxy) hexane; 2,5-dimethyl-2,5-bis(1,1-dimethylethylperoxy) hexyne; 4,4-bis(1,1-dimethylethylperoxy) valeric acid; butyl ester; 1,1-bis(1,1-dimethylethylperoxy)-3,3,5-trimethylcyclohexane; benzoyl peroxide; tert-butyl peroxybenzoate; di-tert-amyl peroxide ("DTAP"); bis(alpha-t-butyl-peroxyisopropyl) benzene ("BIPB"); isopropylcumyl t-butyl peroxide; t-butylcumylperoxide; di-t-butyl peroxide; 2,5-bis(t-butylperoxy)-2,5-dimethylhexane; 2,5-bis(t-butylperoxy)-2,5-dimethylhexyne-3,1,1-bis(t-butylperoxy)-3,3,5-trimethylcyclohexane; isopropylcumyl cumylperoxide; butyl 4,4-di(tert-butylperoxy) valerate; di(isopropylcumyl) peroxide; or dicumyl peroxide; (iv) the (C) organic peroxide is dicumyl peroxide; and (v) a combination of (i) and any one of (ii) to (iv).

5. The composition of claim 1 wherein the peroxide-curable ethylene copolymer composition further comprises at least one of constituents (K) to (O): (K) a colorant; (L) a liquid aromatic or saturated hydrocarbon (LASH); (M) a methyl radical scavenger; (N) a scorch retardant; and (O) a filler.

6. A method of making a peroxide-curable ethylene copolymer composition of claim 1, the method comprising contacting the amounts of constituents (A) to (C), and any optional constituents (D) and (K) to (O), to give the peroxide-curable ethylene copolymer composition.

7. A crosslinked ethylene/alpha-olefin copolymer product that is a product of curing the peroxide-curable ethylene copolymer composition of claim 1.

8. A manufactured article comprising a shaped form of the product of claim 7.

9. A coated conductor comprising a conductive core and an insulation layer at least partially covering the conductive core, wherein at least a portion of the insulation layer comprises the crosslinked ethylene/alpha-olefin copolymer product of claim 7.

10. A method of conducting electricity, the method comprising applying a voltage across the conductive core of the coated conductor of claim 9 so as to generate a flow of electricity through the conductive core.

* * * * *